Nov. 24, 1964   R. A. BLOOM   3,158,241
SELF ENERGIZING FRICTION CLUTCH
Filed Dec. 26, 1961   2 Sheets-Sheet 1
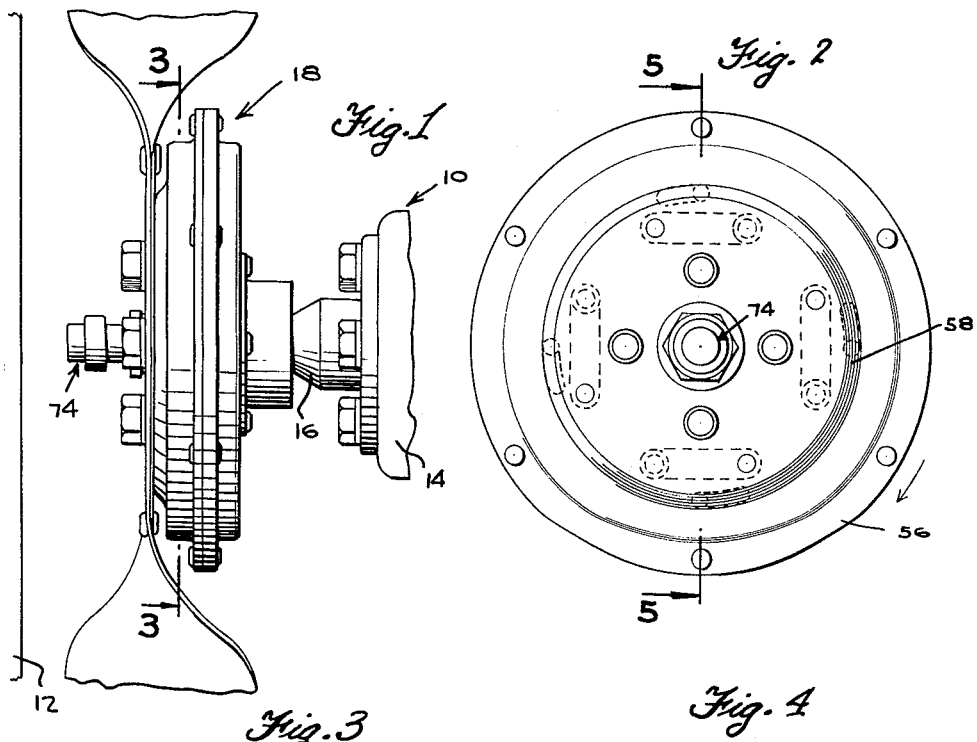
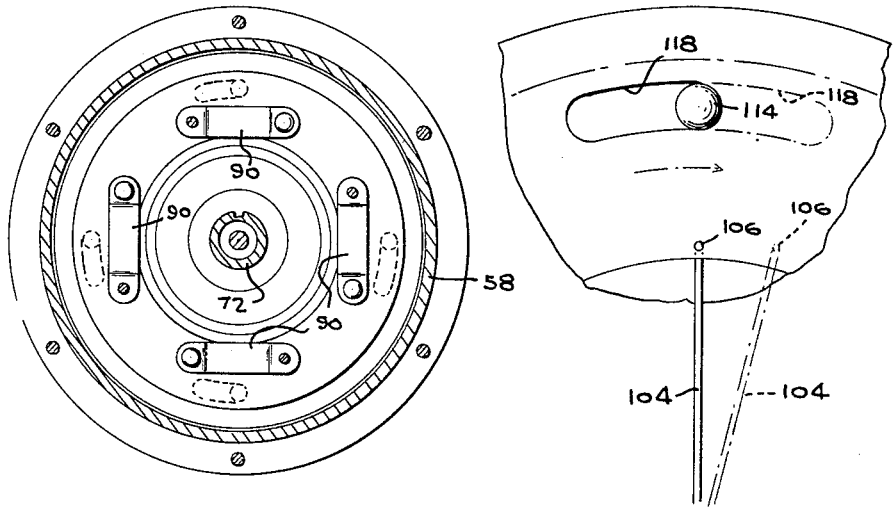
INVENTOR
RICHARD A. BLOOM
BY
　Karl W. Flocks
ATTORNEY Nov. 24, 1964   R. A. BLOOM   3,158,241
SELF ENERGIZING FRICTION CLUTCH
Filed Dec. 26, 1961   2 Sheets-Sheet 2
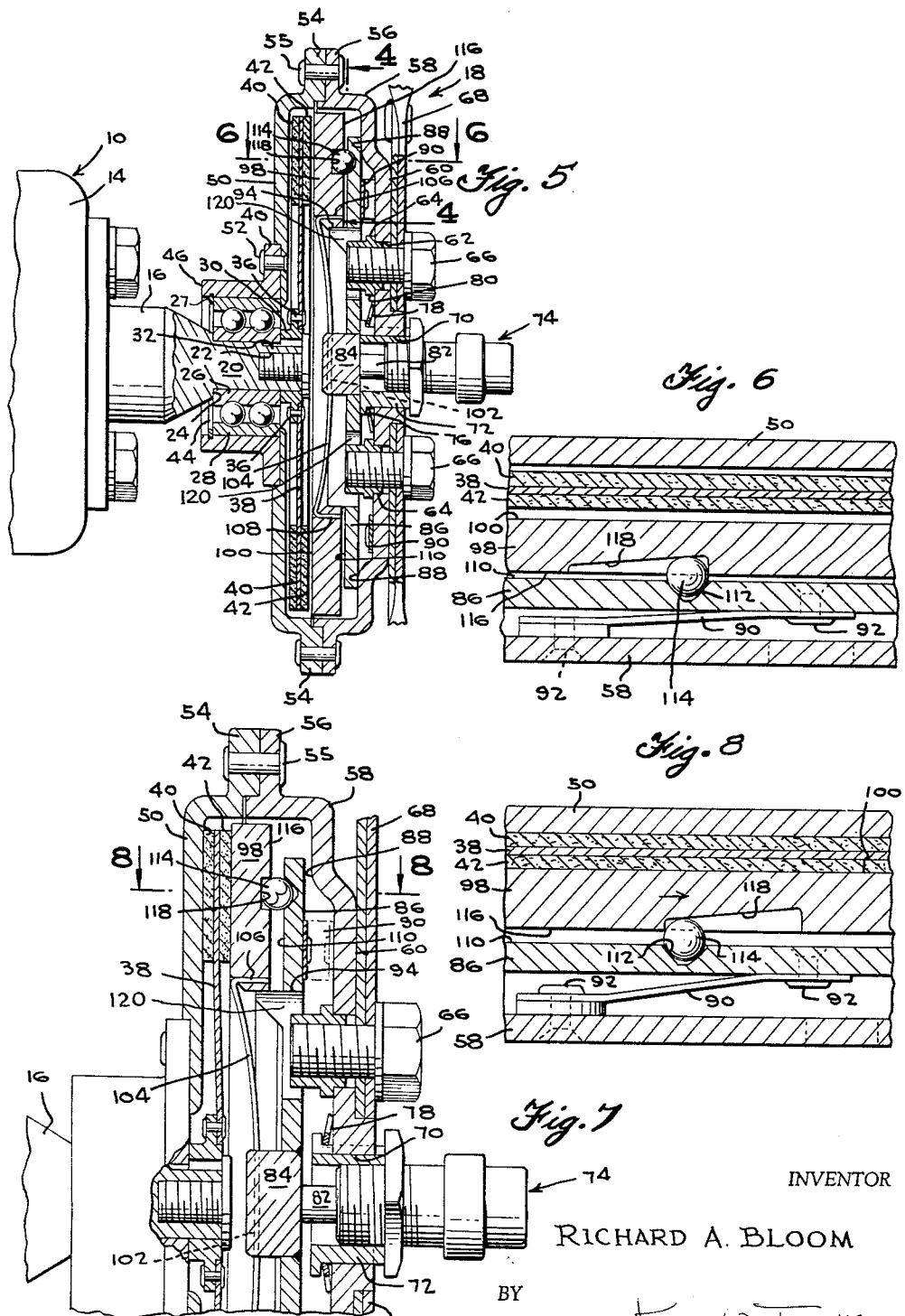
INVENTOR
RICHARD A. BLOOM
BY
KARL W. FLOCKS
ATTORNEY United States Patent Office 3,158,241
Patented Nov. 24, 1964

3,158,241
SELF ENERGIZING FRICTION CLUTCH
Richard A. Bloom, Syracuse, N.Y., assignor to Lipe-Rollway Corporation, Syracuse, N.Y., a corporation of New York
Filed Dec. 26, 1961, Ser. No. 162,001
5 Claims. (Cl. 192—82)

This invention relates generally to friction clutches and more particularly to self-energizing clutches and those including thermally responsive actuating means adapted to initiate control of the transmission of power.

A primary object of the present invention is to provide a novel clutch mechanism wherein a relatively light initial pressure, resulting from actuation of a thermally responsive element or the like, will cause cooperating force transmitting plates to operate in self-energizing relationship to cause confronting clutch plates to be engaged with accompanying transmittal of torque between a driving and a driven element.

A still further object of the present invention is to provide, in a self-energizing clutch of the character mentioned, means whereby the parts are positively returned to a normal or disengaged relationship for subsequent actuation of the cooperating parts.

A still further object of the present invention is to provide, in a clutch mechanism of the character mentioned above, means whereby over-travel of the activating unit is provided for in order to prevent damage thereto.

Other objects and the nature and advantages of the invention will be apparent from the following description taken in conjunction with the accompanying drawings, wherein:

FIG. 1 is a side elevation of the novel clutch assembly of the invention, an inner face portion of a radiator being indicated diagrammatically, and portions of the fan blades being broken away;

FIG. 2 is a front elevation looking from left to right at FIG. 1, with the fan blades removed;

FIG. 3 is a vertical section taken substantially on the plane of line 3—3 of FIG. 1, showing details of strap-type return springs of cooperating force-transmitting plates;

FIG. 4 is an enlarged fragmentary elevation showing details of a camming ball and slot to provide self-energization of the clutch;

FIG. 5 is an enlarged vertical section taken substantially on the plane of line 5—5 of FIG. 2 showing the clutch disengaged;

FIG. 6 is an enlarged fragmentary section taken through the friction disks and self-energizing force-transmitting plates and showing the relation thereof to the strap-type return springs of the invention;

FIG. 7 is a fragmentary still further enlarged vertical section, similar to FIG. 5, but showing the clutch in its actuated or engaged condition; and FIG. 8 is a view similar to FIG. 6 showing the parts in an enlarged condition, the section being taken substantially on the plane of line 8—8 of FIG. 7.

Referring to the drawings in detail, a fragmentary portion of an internal combustion engine or the like is indicated generally at 10, and will generally be of the type which is fluid or water cooled. Disposed forwardly of the engine 10 is a fragmentary portion of a radiator 12 through which air will be drawn, and through which a cooling fluid will be circulated in a manner that is well known. The engine 10 includes a housing 14 having extending forwardly therefrom a constantly driven shaft 16. The shaft 16 will be constantly rotated as the engine 10 is operated and may be belt driven, for example, as disclosed in United States Letters Patent to Heiss No. 2,840,315 issued June 24, 1958.

Operatively connected and mounted on the lower output shaft 16 is a self-energizing friction clutch assembly indicated generally at 18. The power output shaft 16 includes a terminal shaft portion 20 having an axial internally threaded bore 22. Circumposed about the shaft 20 and seated against the annular shoulder 24 of the shaft is the inner race 26 of a double-row bearing 27 including an outer race 28. The inner race 26 rotates with the shaft 20, and circumposed about the terminal end of the shaft 20 in abutting relationship to the adjacent end of the inner bearing race 26 is a mounting hub 30 which is suitably keyed on the shaft 20, as indicated at 32, for simultaneous rotation therewith. The hub 30 is engaged by the head of a cap or machine screw 34 engaged into the internally threaded terminal bore 22 of the shaft 20. The hub 30 has circumposed thereabout and secured thereto by means of rivets 36 a support plate 38 including on opposite sides thereof and suitably secured thereto peripheral, annular friction rings 40 and 42 of any suitable material. As the shaft 20 is rotated, the friction disk or plate 38 will be rotated therewith.

Mounted on the outer bearing race 28, by means of a lock ring 44, is a mounting hub 46 which includes an annular flange 48 to which is fixed a housing half 50 by means of rivets 52 or the like. The housing half 50 includes a peripheral flange 54. The housing half 50, and portions fixedly secured thereto, may be identified as the stator portion of the novel clutch, and the friction plate or disk 38 may be considered to be the rotor portion.

Fixedly secured to the peripheral flange 54 of the housing half 50 by fasteners 55 is the mating flange portion 56 of a second housing half 58. The second housing half 58 includes an annular abutment surface portion 60 having circumferentially spaced thereabout transverse apertures 62 having disposed at the rear surface thereof internally threaded nut elements 64 for receiving therein machine screws 66 for retaining the inner ends of radially disposed cooling fan blades 68 on the abutment surface 60.

The housing half 58 includes an axial bore 70 which has reciprocably supported therein an internally threaded support sleeve 72 which has threaded therein the end portion of a thermally responsive force-transmitting element or assembly 74 which is subject to temperature changes at the radiator. The support sleeve 72 provides a lost-motion connection which compensates for excessive pressure application by the temperature responsive assembly 74 after the friction clutch has been engaged. This function and the structure affording the same will subsequently be described in greater detail. The sleeve 72 has an inner annular flange 76 which is engaged by the inner peripheral portion of a "Belleville" spring 78 or the like, the outer periphery of which is in engagement with the inner surface 80 of the second housing half 58.

Axially spaced from the thermally responsive force-transmitting assembly 74 and normally engaged by an axially displaceable force-transmitting element 82 thereof is a support hub 84 of an annular support plate 86. The plate 86 peripherally engages the inner surface of the housing half 58, as indicated at 88, and is normally urged into engagement therewith by means of a plurality of circumferentially spaced strap spring elements 90 retained by means of rivets 92; for example, see FIGS. 2, 3 and 5–8 to the housing half 58 and plate 86. The springs 90, see FIGS. 5 and 6, normally act to retain the plate 86 in abutting relationship to the inner end of the support sleeve 72 and also serve to urge the force-transmitting portion 82 of the thermally-responsive assembly 74 toward the right, as viewed in FIG. 5, for example, when the temperatures affecting the assembly 74 are below a predetermined value.

Supported for axial movement on a shoulder portion 94 of the support plate 86 is an annular force-transmitting ring or plate 98 which includes a pressure applying face or surface 100 conforming to the annular friction material 42 of the ring 38. Extending diametrically of the hub 84, and suitably fixed thereon in a grooved portion 102 thereof, is an elongated torsion spring or wire 104 having opposed terminal ends 106 and 108 fixed in suitable axially extending aperture portions of the pressure plate 98.

The plate 86 has circumferentially spaced about the inner pressure applying face 110 a plurality of notch portions 112 in which are seated ball elements 114. The confronting face 116 of the pressure applying plate 98 has formed therein a plurality of elongated, arcuate cam grooves 118 tapering inwardly or axially from the face 116 to an intermediate portion of the plate 98. The balls 114, in their cooperating relationship with the camming grooves 118, will cause positive self-energization of the friction clutch as will subsequently be described in detail with respect to the operation.

Plate 86, it will be noted, includes a plurality of circumferentially spaced, large openings or apertures 120, into which the nut elements 64 project. These relatively large openings will permit slight initial circumferential movement of the plate 86 with respect to the housing half 58 during engagement and disengagement of the unit.

Operation

The parts are normally disposed in the condition shown in FIG. 5. The shaft 16, portion 20 thereof, and plate 38 rotate together, and the friction disks 40 and 42 will be spaced from the inner surface of the housing half 50 and the adjacent face 100 of the pressure plate 98. The force-transmitting element 74 will not be effective to initiate operation of the friction clutch, and the force-transmitting portion 82 thereof will be at its rightmost position. Additionally, the plate or spider 86 will be drawn by the strap springs 90 into abutting engagement with the housing half 58, as shown at 88. Still further, the torsion spring 104 will be disposed in a substantially vertical position, as shown by solid lines in FIG. 4, for example. Still further, the spring 78 will urge the sleeve 72 into engagement with the adjacent surface of the plate 86.

When the parts are in this condition, the fan blade 68 will not be rotating, nor will the housing halves 50 and 58 and the cooperating parts therewith.

When a predetermined temperature occurs on the force-transmitting assembly 74, the force-transmitting portion 82 will be urged toward the left, as seen in FIG. 7. When this occurs, the plate hub 84 is caused to move toward the left, which results in leftward movement of the pressure plate 98 causing the support plate 38, which is flexible, to move toward the inner surface of the housing half 50. When this occurs, the plate 98, as a result of the engagement with the constantly rotating disk 38, will have relative angular movement with respect to the pressure plate 86. When this occurs, the parts will assume the position shown in FIG. 8, for example, wherein the ball elements 114 are jammed between the plates 86 and 98, and thus slight axial movement of the plate 98 resulting in self-energization of the friction clutch.

If the temperature at the force-transmitting assembly 74 rises to an appreciable degree, the force-transmitting portion 82 will attempt to continue to move toward the left. However, when this occurs, the entire housing of the force-transmitting assembly is free to move with the sleeve 72 toward the right overcoming the pressure imposed by the "Belleville" spring 78 and compressing or flattening the spring 78, as shown in FIG. 7.

It will be observed that the force-transmitting plate 98 has some relative rotary movement with respect to the support plate 86. This function is clearly illustrated in FIG. 4, wherein it will be noted that the torsion spring 104 has had relative angular movement from the solid to the dotted line position. When the temperature affecting the force-transmitting assembly 74 falls below the predetermined actuating temperature, force will no longer be transmitted at the plunger or force-transmitting portion 82. The strap springs 90 will be effective to move the plate 86 back to the position shown in FIG. 5, the torsion spring 104 will reorient the balls 114 to the position shown in FIG. 4 where pressure is no longer being applied to the constantly rotating support disk 38 and friction portions 40, 42 thereof.

Although the self-energizing friction clutch is especially adapted for use with thermally operated force-transmitting elements, it should be apparent to those skilled in the art that the clutch could be self-energizing and all the cooperating parts could operate in the presence of axially disposed, mechanically operated force-transmitting elements, not necessarily of the character of that particularly illustrated in the exemplary embodiment.

It will be obvious to those skilled in the art that various changes may be made without departing from the spirit of the invention and, therefore, the invention is not intended to be limited to what is shown in the drawings and described in the specification but only as set forth in the appended claims.

What is claimed is:

1. A friction clutch assembly comprising a driving member rotatable on a fixed axis of rotation, a driven member journaled for rotation about the axis of rotation of said driving member, means normally maintaining said driven member out of driving engagement with said driving member, activating means mounted on said driven member for axial movement along the axis of rotation of said driving member and subject to a predetermined condition for overcoming said first mentioned means for permitting engagement between said driving and driven members and causing simultaneous rotation thereof about said axis of rotation, said driving member including a friction disc axially displaceable along said axis of rotation of said driving member, said driven member comprising a housing enclosing said friction disc and including a confronting surface engageable with said friction disc, said driven member including an axially displaceable first pressure plate disposed within said housing, said means maintaining said driven member out of driving engagement with said driving member comprising spring means within said housing and terminally secured between said pressure plate and said housing member opposite said confronting surface, and lost motion means interposed between said activating means and said housing member for compensating for over-travel of said activating means, said lost motion means comprising a sleeve circumposed about said activating means and reciprocably supported for axial movement on said housing along the axis of rotation of said driving member and axially spaced therefrom, and a spring element interposed between said sleeve and said housing and normally urging said sleeve toward an activating position in opposition to said spring means maintaining the driven member out of driving engagement with said driving member.

2. A friction clutch assembly as set forth in claim 1 wherein said activating means comprises an axially disposed, thermally responsive assembly, said spring element comprising an annular spring circumposed about said sleeve in abutting engagement between an inner surface portion of said housing and a shoulder portion on said sleeve.

3. The friction clutch assembly as set forth in claim 1 wherein said driven member includes a second pressure plate disposed between said friction disc and said first-mentioned pressure plate, self-energizing means interposed between said pressure plates for causing relative rotary movement therebetween in response to axial movement of one of said pressure plates, and torsion spring means extending between said pressure plates for opposing relative rotation between said pressure plates to maintain said self-energizing means de-energized.

4. A friction clutch assembly as set forth in claim 3 in which said torsion spring means comprises a wire having a portion extending radially from the axis of rotation of said driving member and being terminally connected between said pressure plates.

5. The structure of claim 3 in which said self-energizing means comprises an angular camming portion on one of said pressure plates and opening toward an adjacent opposing surface portion of said other pressure plate, and a ball element rotatably received in the opposing surface of said other pressure plate and extending into the angular camming portion of said first mentioned pressure plate.

References Cited by the Examiner

UNITED STATES PATENTS

| 1,934,850 | 11/33 | Fromaget | 192—68 |
| 2,221,399 | 11/40 | Geyer | 192—32 |
| 2,245,988 | 6/41 | Lambert. | |
| 2,658,400 | 11/53 | Dodge. | |
| 2,791,100 | 5/57 | Maurer. | |
| 2,879,755 | 3/59 | Weir. | |

FOREIGN PATENTS

| 1,196,282 | 5/59 | France. |
| 499,882 | 1/39 | Great Britain. |

DAVID J. WILLIAMOWSKY, *Primary Examiner.*